(12) United States Patent
Bauer et al.

(10) Patent No.: US 10,394,041 B2
(45) Date of Patent: Aug. 27, 2019

(54) POLARIZER ASSEMBLY FOR SPATIALLY SEPARATION POLARIZATION STATES OF A LIGHT BEAM

(71) Applicant: Carl Zeiss SMT GmbH, Oberkochen (DE)

(72) Inventors: Markus Bauer, Oberkochen (DE); Holger Muenz, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 453 days.

(21) Appl. No.: 14/862,292

(22) Filed: Sep. 23, 2015

(65) Prior Publication Data

US 2016/0018664 A1 Jan. 21, 2016

Related U.S. Application Data

(63) Continuation of application No. PCT/EP2014/056480, filed on Mar. 31, 2014.

(30) Foreign Application Priority Data

Apr. 2, 2013 (DE) .......................... 10 2013 103 282

(51) Int. Cl.
  *G02B 27/28* (2006.01)
  *G02B 27/12* (2006.01)
  (Continued)

(52) U.S. Cl.
  CPC .............. *G02B 27/285* (2013.01); *F21V 9/14* (2013.01); *G02B 5/3066* (2013.01);
  (Continued)

(58) Field of Classification Search
  CPC .. G02B 27/285; G02B 5/3066; G02B 5/3075; G02B 5/3091; G02B 27/12; G02B 27/126; G02B 27/283; F21V 9/14
  (Continued)

(56) References Cited

U.S. PATENT DOCUMENTS 2,437,126 A * 3/1948 Reardon et al. ............... 106/238
3,552,823 A * 1/1971 Badoz et al. ........ G02B 27/283
  359/489.09

(Continued)

FOREIGN PATENT DOCUMENTS

DE 2122920 A1 12/1971
DE 2217175 A1 3/1973
(Continued)

OTHER PUBLICATIONS

Printout of webpage http://www.unitedcrystals.com/POverview.html, archived 2011.*

(Continued)

*Primary Examiner* — George G King
(74) *Attorney, Agent, or Firm* — Fish & Richardson P.C.

(57) ABSTRACT

The disclosure provides to a birefringent polarizer assembly for spatially separating polarization states of a light beam, in particular in the spectral range below 300 nm. The assembly includes a first prism on the light input side and a further prism on the light output side, which are arranged along a principal light incidence direction. The first prism has a first light entrance surface and a first light exit surface. The further prism has a further light entrance surface, facing the first light exit surface, and a further light exit surface. The prisms in each case have an optical principal crystal axis oriented substantially perpendicularly to the principal light incidence direction. The crystal axes of two adjacent prisms are oriented perpendicularly to one another. A normal to the further light exit surface forms an angle not equal to 0° with the principal light incidence direction.

14 Claims, 5 Drawing Sheets

(51) Int. Cl.
*G02B 5/30* (2006.01)
*F21V 9/14* (2006.01)

(52) U.S. Cl.
CPC ......... *G02B 5/3075* (2013.01); *G02B 5/3091* (2013.01); *G02B 27/12* (2013.01); *G02B 27/126* (2013.01); *G02B 27/283* (2013.01)

(58) Field of Classification Search
USPC .................. 359/485.06, 489.01, 489.09
See application file for complete search history.

(56) References Cited

U.S. PATENT DOCUMENTS

| | | | |
|---|---|---|---|
| 3,692,385 A | | 9/1972 | Gievers |
| 3,914,018 A | * | 10/1975 | DeShazer ............... G02B 1/08 359/489.09 |
| 4,556,292 A | * | 12/1985 | Mathyssek ........... G02B 5/3066 359/484.04 |
| 5,774,215 A | | 6/1998 | Padgett et al. |
| 6,646,802 B2 | | 11/2003 | Yamamoto |
| 6,661,577 B1 | | 12/2003 | Wu et al. |
| 2002/0044354 A1 | | 4/2002 | Yamamoto |
| 2008/0018991 A1 | * | 1/2008 | Winik ................ G02B 27/283 359/352 |
| 2013/0070331 A1 | | 3/2013 | Dewa et al. |
| 2014/0133014 A1 | * | 5/2014 | Li .......................... C30B 9/12 359/352 |

FOREIGN PATENT DOCUMENTS

| | | |
|---|---|---|
| DE | 19636711 A1 | 3/1997 |
| DE | 19611037 A1 | 9/1997 |
| GB | 459171 A | 1/1937 |
| JP | S48-16568 | 5/1973 |
| JP | S52-49967 | 12/1977 |
| JP | S5754906 * | 4/1982 ............ G02B 27/28 |
| JP | S59228610 A | 12/1984 |
| JP | S64-29804 | 1/1989 |
| JP | H01241502 A | 9/1989 |
| JP | H09-80211 | 3/1997 |
| JP | H09-178940 | 7/1997 |
| JP | H10-133202 | 5/1998 |
| JP | H11-264904 | 9/1999 |
| JP | 2000009932 * | 1/2000 ............ G02B 27/28 |
| JP | 2000009932 A | 1/2000 |
| JP | 2002-031716 | 1/2002 |
| JP | 2005-326522 | 11/2005 |
| JP | 2010-2846 | 1/2010 |
| WO | WO90/15357 A1 | 12/1990 |
| WO | WO2005/085917 A1 | 9/2005 |
| WO | WO2005/111557 A1 | 11/2005 |

OTHER PUBLICATIONS

Ebizuka et al. "Novel Direct Vision Prism and Wollaston Prism Assembly for Diffraction Limit Applications" Proc. of SPIE vol. 7018, 70184S (Year: 2008).*
Japanese Office Action and English translation thereof for corresponding JP Appl. No. 2016-505790, dated Jan. 20, 2017, 5 pages.
Japanese Office Action with English translation thereof for JP Appl. No. 2016-505790, dated Sep. 12, 2016, 8 pages.
Korean Office Action with English translation thereof for KR Appl. No. 10-2015-7030522, dated Nov. 21, 2016, 16 pages.
International Preliminary Report on Patentability for corresponding PCT App No. PCT/EP2014/056480, dated Mar. 31, 2014.
International Search Report for International Application No. PCT/EP2014/056480 dated Jun. 20, 2014.

* cited by examiner

POLARIZER ASSEMBLY FOR SPATIALLY SEPARATION POLARIZATION STATES OF A LIGHT BEAM

CROSS-REFERENCE TO RELATED APPLICATIONS

The present application is a continuation of, and claims priority under 35 U.S.C. § 120 to, international application serial number PCT/EP2014/056480, filed Mar. 31, 2014, which claims benefit under 35 U.S.C. § 119 of German patent application DE 2013 103 282.6, filed Apr. 2, 2013. The entire contents of these applications are incorporated by reference herein.

FIELD

The disclosure relates to a birefringent polarizer assembly for spatially separating polarization states of a light beam, in particular in the spectral range below 300 nm, including at least two prisms, which include a first prism on the light input side and a further prism on the light output side, which are arranged along a principal light incidence direction, wherein the first prism has a first light entrance surface and a first light exit surface and the further prism has a further light entrance surface, facing the first light exit surface, and a further light exit surface, wherein the prisms in each case have an optical principal crystal axis, which are oriented substantially perpendicularly to the principal light incidence direction, wherein the crystal axes of two adjacent prisms are oriented perpendicularly to one another, wherein a normal to the further light exit surface forms an angle not equal to 0° with the principal light incidence direction.

Furthermore, the disclosure relates to an apparatus for inspecting semiconductor slabs, in particular wafers for the semiconductor industry, including a light source, an illumination optical unit and an imaging optical unit, which are arranged successively along a principal light incidence direction.

BACKGROUND

A birefringent polarizer assembly is known from JP 2000-009932 A. An apparatus for inspecting semiconductor slabs of the type mentioned in the introduction is known from US 2013/0070331 A.

Without restricting the generality, such a polarizer assembly is used for spatially separating light beams having different polarizations. Light having different polarizations is used in particular in apparatuses for inspecting semiconductor slabs in order to obtain a better surface contrast when illuminating the slabs.

The polarizer assembly includes at least two prisms constructed of a birefringent material, wherein the principal crystal axes of the respective materials from which the prisms are constructed have an orientation with respect to one another that is characteristic of the polarizer assembly.

In crystal optics, the principal crystal axis denotes the direction in an optically anisotropic uniaxial crystal along which each polarization component of a light beam experiences the same refractive index. It goes without saying here that a light beam includes a plurality of light rays or partial beams of light rays. When the light beam is incident in a direction that it is not parallel to the principal crystal axis, the light beam is separated into a first partial beam, which is designated as ordinary ray, and into a second partial beam, which is designated as extraordinary ray. In principle, there is also the possibility of using multiaxial crystals having more than one principal crystal axis for the prisms of the polarizer assembly. Upon oblique incidence on an interface, the light beam is split into partial beams having different polarizations. In this case, the first partial beam has a first polarization state, and the second partial beam has a second polarization state, which in each case have linear polarizations without restricting the generality. The first and second polarization states here are typically represented as the eigenpolarizations, namely the S-polarization and the P-polarization, wherein the P-polarization is oriented in the plane of incidence and the S-polarization is oriented perpendicularly to the plane of incidence. It goes without saying, however, that polarization states can also be present which can have a different orientation of the polarization direction than the S- or P-polarization and can also have a different polarization than the linear polarization.

The polarizer assembly splits the light beam which is incident from a first half-space and which impinges on a first light entrance surface of a first prism along a principal light incidence direction into partial beams having different polarizations which propagate through the polarizer assembly and via a further light exit surface of a further prism into a second half-space. The principal light incidence direction should be understood to mean the optical axis of the polarizer assembly.

The spatial separation of the partial beams in the second half-space is in turn characteristic of the orientation of the principal crystal axes of the respective prisms used in the polarizer assembly with respect to one another.

Depending on the purpose of use, specific advantages and disadvantages arise here for the prism arrangement described in the introduction, which is also designated as a Wollaston prism arrangement, compared with other forms of the arrangement of prisms such as the Rochon arrangement, for example, in which the principal crystal axes of the respective prisms are aligned differently relative to one another and to the principal light incidence direction.

A specific advantage of the Wollaston prism arrangement here is that a splitting angle of the individual partial beams that is increased in relation to the Rochon arrangement is achieved in the second half-space.

However, the Wollaston prism arrangement has the disadvantage that both partial beams passing in the second half-space downstream of the prism arrangement have an orientation that is not parallel to the principal light incidence direction, which is disadvantageous particularly when the birefringent polarizer assembly is used in an imaging system. Furthermore, both partial beams passing in the second half-space have a beam offset in terms of location and in terms of angle in relation to the principal light incidence direction and a great spectral color dependence. Moreover, the Wollaston prism arrangement, in particular, when used in an apparatus for inspecting semiconductor slabs, which typically include light sources having high etendues, exhibits an inadequate spatial separation of the different partial beams having different polarizations. The disadvantages mentioned above therefore make it more difficult to implement a modular use of a Wollaston prism arrangement in an optical set-up, since here the installation or demounting of the Wollaston prism arrangement leads to a disadvantageous influencing of the beam characteristic.

The birefringent polarizer assembly known from the document JP 2000-009932 A cited in the introduction includes three prisms. The light exit surface of the last prism as viewed in the light propagation direction is inclined at an angle relative to the principal light incidence direction. In this case, the angle is set in such a way that the light beam emerging from the last light exit surface is parallel to the incident light beam.

WO 90/15357 A1 discloses a birefringent polarizer assembly in which a wholly or partly plane-parallel plate or a wholly or partly plane-parallel air space is present between the first and last optical elements of the polarizer. The light beams emerging from the polarizer are thereby intended to be oriented in a defined manner.

DE 22 17 175 A discloses a polarizer assembly which consists of two prisms, between which a wedge-shaped air gap is present.

U.S. Pat. No. 6,661,577 B1 discloses a beam splitter designed as a birefringent Wollaston polarizer assembly and provided for splitting a beam into partial beams having different polarizations. For this purpose, the polarizer assembly includes a Wollaston prism, which splits the two partial beams at a splitting angle relative to the principal light incidence direction. The two partial beams split relative to one another are refracted by a birefringent double wedge disposed downstream at a distance from the Wollaston prism in such a way that the partial beams disposed downstream of the double wedge are aligned parallel to the principal light incidence direction.

The known beam splitter has the disadvantage, however, that the use of different optical elements used for beam splitting and for correction of the beam direction in a spatially extended optical set-up is disadvantageous with regard to a compact design of the beam splitter having low susceptibility to disturbances. What is disadvantageous about the known beam splitter, moreover, is that the parallel alignment of both partial beams makes it more difficult to separate the different partial beams from one another since the latter no longer diverge relative to one another.

Furthermore, WO 2005/085917 A1 discloses a broadband Glen-Thompson polarizer for splitting a principal ray into two partial beams having different polarizations. In this case, one of the two partial beams is subjected to total internal reflection at the interface between the two prisms and is segregated from the partial beam having the other polarization.

What is disadvantageous about this arrangement is that only greatly birefringent materials can be used, which greatly restricts the flexibility in the choice of materials, particularly in the visible or infrared spectral range. Moreover, such an arrangement is not suitable without restriction for the ultraviolet spectral range since sufficiently great birefringence cannot be obtained on account of the dispersion of the materials typically used. At the interface at which one partial beam is segregated by total internal reflection, furthermore, on account of the very shallow angle of the interface between the two prisms in relation to the principal light incidence direction, very great reflection losses of the partial beam which passes through the entire beam splitter typically occur as well. This aspect is disadvantageous particularly with regard to a desired high transmission of the optical component.

SUMMARY

Therefore, the disclosure seeks to provide a polarizer assembly and an apparatus for inspecting semiconductor slabs to the effect that the greatest possible splitting of the partial beams having different polarizations is ensured in conjunction with the smallest possible spatial extent of the polarizer assembly. Moreover, the disclosure seeks to bring about a direction correction of at least one of the partial beams relative to the principal light incidence direction in such a way as to ensure the smallest possible spatial deviation (offset) and/or the smallest possible angular deviation of the at least one partial beam in relation to the principal light incidence direction.

The disclosure also seeks to provide a polarizer assembly which introduces as few aberrations as possible into the light beam passing through the polarizer assembly, i.e. which is corrected optically well.

The disclosure provides a polarizer assembly for which a normal to the first light entrance surface forms a first angle not equal to 0° with the principal light incidence direction, and for which the first light entrance surface and the further light exit surface are inclined in opposite directions with respect to one another relative to a plane perpendicular to the principal light incidence direction.

The disclosure provides an apparatus for inspecting semiconductor slabs for which the illumination optical unit and/or the imaging optical unit include(s) a polarizer assembly according to the disclosure.

According to the disclosure, both the first light entrance surface and the further light exit surface are oriented in a manner not perpendicular to the principal light incidence direction. This has the advantage that by setting the angle α1 and the angle α2, it is possible to perform a beam correction to the effect that one of the partial beams after emerging from the polarizer assembly is oriented substantially along the principal light incidence direction. By virtue of the fact that both the first light entrance surface and the further light exit surface are inclined relative to the principal light incidence direction (optical axis), by comparison with the polarizer assembly known from the document JP 2000-009932 A, this affords the advantage that the angles α1 and α2 can be chosen to be smaller than if only the last light exit side alone is inclined, because the total inclination are divided between the first light entrance surface and the last light exit surface by the assembly according to the disclosure. The inclination of the first light entrance surface and the last light exit surface in opposite directions with respect to one another has the further advantage that a beam offset between the light beam emerging from the polarizer assembly and the light beam incident in the polarizer assembly can be avoided. An alignment of at least one of the partial beams along the principal light incidence direction is advantageous particularly if further optical components, in particular imaging optical units, are disposed downstream of the polarizer assembly. An alignment of at least one of the partial beams along the principal light incidence direction is moreover also advantageous if light having different polarization directions and/or light that is optionally polarized or unpolarized impinge(s) on the polarizer assembly. In this case, it is always advantageous if the at least one partial beam has as far as possible no beam offset in terms of angle and/or in terms of location in relation to the principal light incidence direction.

The fact that the direction correction of the partial beams is brought about directly at the polarizer assembly makes it possible to achieve both a spatial separation of the polarization components and the direction correction in a very confined space and on the basis of a single optical component or an associated assembly.

The inclination of the first light entrance surface and/or of the further light exit surface makes it possible to achieve a direction correction of the light beams having different polarizations that are spatially separated by the prism arrangement to the effect that at least one of the light beams passes in the second half-space downstream of the further light exit surface substantially along the principal light incidence direction. A beam path in which the partial beam has as far as possible no beam offset in terms of angle and/or in terms of location in relation to the principal light incidence direction is advantageous particularly with regard to a use of the polarizer assembly with a downstream imaging optical unit, since, as a result, imaging aberrations are reduced and, moreover, a uniform illumination of the optical units is achieved.

Preferably, the first angle and the angle which the normal to the further light exit surface forms with the principal light incidence direction are identical in terms of absolute value. This has the advantage that the polarizer assembly in this configuration is already corrected optically well because the first light entrance surface and the last light exit surface are arranged mirror-symmetrically with respect to one another and, furthermore, a beam offset between the light beam emerging from the polarizer assembly and the light beam incident in the polarizer assembly also occurs.

In one preferred configuration, a number n of prisms, where n≥1, are arranged between the first prism and the further prism. The prisms each have optical principal crystal axes, which have orientations alternating with respect to one another in the principal light incidence direction. In order to obtain the greatest possible splitting of the partial beams, it is additionally advantageous for the angles of inclination of the mutually facing light entrance and light exit surfaces of directly adjacent prisms to be chosen to be as small as possible, since the optical path of the light in the polarizer assembly is increased as a result. In this case, the angle of inclination is given by the angle formed by the light entrance and respectively light exit surfaces and the principal light incidence direction. However, the choice of the angles of inclination is limited by the total internal reflection at the interfaces between the respective prisms and also by the desire for the smallest possible spatial extent of the polarizer assembly.

By arranging more than two prisms along the principal light incidence direction, it is possible to achieve an even more improved spatial separation of the partial beams. In this case, in particular, the alignment of the principal crystal axes of the individual prisms which are oriented perpendicularly to one another and to the principal light incidence direction and have orientations alternating with respect to one another in the principal light incidence direction has a particularly advantageous effect on the spatial separation of the polarization states of the light beam, since this arrangement constitutes a juxtaposition of Wollaston prism arrangements, each of which by itself already enables an advantageous angular splitting in comparison with other prism arrangements.

A further preferred configuration is given by an odd number of prisms which are arranged one behind another in the principal light incidence direction and which are arranged symmetrically along the principal light incidence direction. In this configuration, the number n of between the first prism and the last prism is accordingly an odd number. Overall, this gives rise to a polarizer assembly in which the prisms present together form an arrangement between the first light entrance surface and the last light exit surface, which arrangement is mirror-symmetrical relative to a central plane of symmetry perpendicular to the principal light incidence direction.

Such an arrangement makes it possible to compensate for geometrical aberrations, such as coma, or chromatic aberrations. The light beam propagating through the prisms, which light beam can include light having different wavelengths, thus has, for a wide spectral range, virtually no color-dependent deflection and virtually no color-dependent beam offset. Non-wavelength-dependent aberrations, such as coma, for example, are also compensated for by the fully symmetrical configuration of the polarizer assembly. Overall, the polarizer assembly according to the disclosure in this configuration is corrected optically very well. Moreover, the symmetrical arrangement of the prisms in the principal light incidence direction ensures that a light beam impinging on the prism arrangement along the principal light incidence direction is split into partial beams having different polarizations, at least one of which partial beams leaves the prism arrangement again substantially along the principal light incidence direction.

In one preferred configuration of the polarizer assembly, one or three prisms is or are arranged between the first prism and the further prism.

In a further preferred configuration of the polarizer assembly, the first prism has a first wedge and/or the further prism has a further wedge, which have the first light entrance surface and/or the further light exit surface.

The use of a first wedge and/or of a further wedge having the first light entrance surface and/or the further light exit surface makes it possible to bring about a direction correction of the individual polarization states of the light beam in a very simple manner. In this case, relative to the respective wedge, the first prism and the further prism can have an adjoining interface which is oriented parallel to the corresponding interface of the respective wedge and e.g. perpendicularly to the principal light incidence direction. In this case, the correction of the individual partial beams is substantially directed to the offset of the beam or to the deflection angle. In this case, the wedges can be exchanged very simply, as a result of which, for limited spectral ranges of the light, for example, exact spatial corrections of the light beam or of the light rays contained therein can be carried out in order to take account of e.g. the chromatic aberrations of the individual prisms.

The polarizer assembly is thus useable, in principle, in a large spectral range, wherein the wedges for customary birefringent materials such as magnesium fluoride or quartz, for example, in a notably wide spectral range extending from the infrared through to the ultraviolet, have virtually achromatic properties, as a result of which a quasi-achromatic correction of the beam direction can be ensured.

In the present case, the wedges include the same material and the same alignment of the principal crystal axes as the respective prism to which the wedges are assigned. It goes without saying, however, that the wedges can also include other birefringent materials having an alignment of the principal crystal axes that is identical to or different than the respective prisms, or else non-birefringent materials.

In a further preferred configuration, the light beam includes a first partial beam, which has a first polarization state P oriented parallel to the plane of incidence, and a second partial beam, which has a polarization state S perpendicular to the first polarization state P and oriented perpendicularly to the plane of incidence, wherein the first angle α1 and/or the further angle α2 are/is defined in such a way that one of the partial beams after emerging from the further light exit surface is oriented substantially along the principal light incidence direction, wherein the partial beam oriented substantially along the light principal light incidence direction is preferably the first partial beam.

An alignment of at least one of the partial beams having different polarizations along the principal light incidence direction is advantageous particularly if the polarizer assembly is used in conjunction with an imaging optical unit disposed downstream of the polarizer assembly. An illumination of the imaging optical unit with parallel light beams is particularly advantageous in this case since a uniform illumination of the imaging optical unit is achieved as a result. Moreover, the orientation of at least one of the partial beams in the second half-space, which is aligned substantially along the principal light incidence direction and thus has a negligible spatial and/or angular deviation in relation to the principal light incidence direction, allows a modular use of the polarizer assembly since the latter can readily be installed or demounted without significantly influencing the beam path.

In this case, the first partial beam, the polarization state P of which is oriented parallel to the plane of incidence, is preferably used since, for this polarization state, a reflection loss reduced by comparison with the polarization state S perpendicular thereto arises at the light entrance surfaces or light exit surfaces of the prisms. An increased transmission of the polarizer assembly can be achieved as a result.

In a further preferred configuration, the mutually facing light exit surfaces and the light entrance surfaces of directly adjacent prisms run parallel to one another. In this case, the mutually facing light exit surfaces and light entrance surfaces of the directly adjacent prisms can be arranged with a gap or in a manner directly adjoining one another, wherein a possible gap present has a very small gap thickness.

The abovementioned aspects also contribute to avoiding or at least minimizing aberrations in the light beam passing through the polarizer assembly.

In a further preferred configuration, the mutually facing light exit surfaces and light entrance surfaces of at least two prisms that are directly adjacent to one another form with the light beam an angle in an angular range which is not equal to the angular range of total internal reflection of the respective prism.

This prevents the partial beams from being subjected to total internal reflection at the respective light exit surfaces or light entrance surfaces of the prisms, which would have the effect that no light would be transmitted in the principal light incidence direction.

In a further preferred configuration, the mutually facing light exit surfaces and light entrance surfaces of at least two prisms that are directly adjacent to one another form with the light beam an angle which corresponds to the Brewster angle of the respective prism.

For the first partial beam, which is oriented parallel to the plane of incidence, impingement on the light entrance surfaces or light exit surfaces of the prisms at the Brewster angle is particularly advantageous since no reflection losses arise in this case for the first partial beam. The arrangement of the light entrance or light exit surfaces of the respective prisms relative to the light beam at the Brewster angle are additionally advantageous since an at least partial polarization of the transmitted beam arises in this case, which results in an attenuation of the second partial beam and facilitates the separation of the partial beams in the second half-space.

In a further preferred configuration of the disclosure, at least one of the mutually facing light exit surfaces and light entrance surfaces of at least two prisms that are directly adjacent to one another forms with one of the partial beams an angle which is in the angular range of total internal reflection of the restrictive prism.

This configuration has the advantage that one of the partial beams can be subjected to total internal reflection at one of the light exit surfaces and can thus be coupled out and separated from the light beam. Consequently, a separation of the partial beam that is not required can be achieved in a particularly simple manner. Moreover, the mutually facing remaining light exit surfaces and light entrance surfaces of the prisms can also still be inclined at the Brewster angle, which leads to a particularly good transmission of the propagating partial beam. It goes without saying that the light exit surface at which total internal reflection is brought about is preferably arranged between the penultimate prism and the last prism in the propagation direction.

In a further preferred configuration of the disclosure, the mutually facing light exit surfaces and light entrance surfaces of at least two prisms that are directly adjacent to one another have an orientation which is rotated relative to one another about the principal light incidence direction and/or is tilted relative to a plane perpendicular to the principal light incidence direction.

This configuration has the advantage that the direction and the splitting of the partial beams having different polarizations can be influenced independently of one another in the second half-space, as a result of which the spatial distribution of the partial beams in an arbitrary imaging plane downstream of the polarizer assembly is adjustable. This is advantageous particularly if the light source has a beam profile having an at least partly overlapping spatial intensity distribution or polarization distribution.

In a further preferred configuration, the optical principal crystal axes—perpendicular to one another and to the principal light incidence direction—of at least two prisms that directly adjoin one another have orientations which are oriented arbitrarily but fixedly in a plane perpendicular to the principal light incidence direction.

This configuration has the advantage that the direction and the splitting of the partial beams in the second half-space can be influenced even further, as a result of which the spatial distribution of the partial beams in an arbitrary imaging plane downstream of the polarizer assembly is adjustable. This configuration can be combined in particular with the configuration described above. These configurations are advantageous by themselves and primarily in combination particularly if the light source has a beam profile having at least partly overlapping spatial intensity distribution or polarization distribution. It goes without saying, however, that these configurations also afford advantages in the case of a homogeneous intensity distribution or polarization distribution of the incident light beam, since the spatial splitting can be influenced in a targeted manner.

In a further configuration of the disclosure, thin-gapped interspaces filled with a gas or with a connection material are situated between the light exit surfaces and the light entrance surfaces of at least two prisms that are directly adjacent to one another, wherein the gas predominantly includes an inert gas, and the connection material includes an optical cement matched to the refractive index of the prisms.

The use of a connection material, in particular an optical cement, matched to the refractive index of the prisms is advantageous since reflection losses at the light exit surfaces or the light entrance surfaces of the respective prisms are reduced as a result. The use of a gas, in particular an inert gas, is advantageous since the action of light does not alter the composition of the gas, e.g. by photolysis.

In principle, the optical cement or the gas has material properties that make it resistant to irradiation with UV light, in particular VUV light. For this purpose, it can be advantageous for the polarizer assembly to be arranged in a vacuum, as a result of which the gas is removed as completely as possible around the prism arrangement and between the interfaces, if optical cement resistant to irradiation with UV light is not used. In this case, the remaining residual gas is preferably an inert gas including nitrogen or argon, in particular. Moreover, the optical cement can be chosen in such a way as to promote a propagation of the light beam at the Brewster angle or at an angle in the angular range of total internal reflection.

In a further configuration, at least one of the interspaces is filled with the connection material and a further interspace, disposed downstream of the at least one interspace along the principal light incidence direction, is filled with the gas.

This configuration of the disclosure is advantageous particularly in combination with the abovementioned configuration in which the second partial beam is segregated by means of total internal reflection, since the total internal reflection can be achieved in a very simple manner by virtue of the great contrast in refractive index at the light exit surface between the prism and the gas-filled interspace.

It goes without saying, however, that the interspace can also be filled with an optical cement that preferably has a low refractive index in comparison with the prisms. The interspaces between the remaining prisms, if present, are filled either with a gas or with an optical cement. Moreover, it goes without saying that the remaining prisms, at the light exit surfaces, too, can be wrung onto the light entrance surfaces of the respectively directly adjacent prism, as a result of which the interspace substantially disappears.

In a further configuration of the aspects according to the disclosure, the light entrance surfaces and/or the light exit surfaces of the prisms have an antireflection coating.

An antireflection coating present at the light entrance and/or light exit surfaces has an advantageous effect on the transmission of the entire polarizer assembly. In this case, the antireflection coating can be chosen in particular in such a way that the transmission has particularly high values in a broadband manner or in a desired spectral range.

In a further configuration of the aspects according to the disclosure, the prisms have top surfaces and base surfaces which are aligned substantially parallel to the principal light incidence direction, wherein at least one of the prisms has a light-absorbing coating at the top surface and/or the base surface.

The use of a light-absorbing coating at the top and/or base surfaces of the prisms makes it possible to significantly reduce the occurrence of stray light generated by the reflection of the light beam at the light exit and/or light entrance surfaces of the prisms, which leads to an improved optical quality of the polarizer assembly. This also holds true, in particular, for the case where one of the partial beams is subjected to total internal reflection at one of the light exit surfaces.

In a further configuration of the disclosure, the prisms and/or the wedges substantially consist of magnesium fluoride (MgF2). The use of magnesium fluoride as crystal material for the prisms and/or the wedges arranged at the first prism and/or at the further prism is particularly advantageous since magnesium fluoride has advantageous properties with regard to transmission and/or refractive index for the UV spectral range, in particular for the VUV spectral range.

Further advantages and features are evident from the following description and the accompany drawing.

It goes without saying that the features explained above and those yet to be explained below can be used not only in the combination respectively indicated, but also in other combinations or by themselves, without departing from the scope of the present disclosure.

BRIEF DESCRIPTION OF THE DRAWINGS

Exemplary embodiments of the disclosure are illustrated in the drawing and are described in greater detail with reference to the drawing, in which.

DETAILED DESCRIPTION

Figure 1:
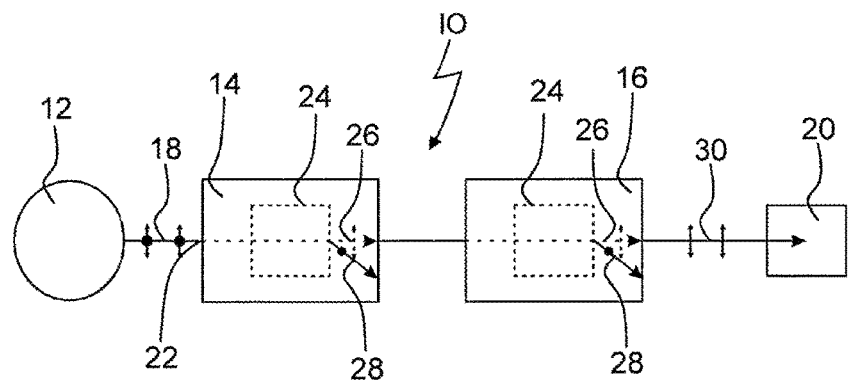
FIG. 1 shows an apparatus for inspecting semiconductor slabs in a schematic illustration, which includes at least one polarizer assembly.

FIG. 1 illustrates an apparatus for inspecting semiconductor slabs, which is provided with the general reference sign 10. The apparatus includes a light source 12, an illumination optical unit 14 and an imaging optical unit 16, which are arranged successively along a principal light incidence direction 18 for illuminating and for inspecting a semiconductor slab 20.

In this case, the light source 12 used for illumination emits unpolarized or only partly polarized light in a light beam 22. In order to obtain the highest possible contrast of the surface of the semiconductor slab 20 during the inspection, it is desirable, however, for the light beam 22 impinging on the semiconductor slab 20 to have a polarization state that is as uniform as possible.

For this purpose, the illumination optical unit 14 and/or the imaging optical unit 16 include(s) at least one polarizer assembly 24 which splits the unpolarized or only partly polarized light from the light source 12 in such a way that a spatial separation of a first partial beam 26, which has a first polarization state, from a second partial beam 28, which has a second polarization state, is made possible.

Without restricting the generality, the first polarization state is P-polarization, in which the polarization vector is aligned parallel to the plane of incidence of the respective polarizer assembly 24, and the second polarization state is S-polarization, which is aligned perpendicularly to the respective plane of incidence. In the present case, the plane of incidence is spanned by the principal light incidence direction 18 and an arbitrary vector aligned perpendicularly to the interface of the polarizer assembly 24.

Consequently, a beam 30 whose polarization state substantially corresponds to the P-polarization of the first partial beam 26 impinges on the semiconductor slab 20.

It goes without saying, however, that the polarizer assembly 24 can also spatially split the light beam 22 in such a way that the beam 30 can also have an S-polarization state or a linear combination of an S- and/or P-polarization state.

Exemplary embodiments of polarizer assemblies for use in the apparatus 10 are described below with reference to FIGS. 2 to 8.

Figure 2:
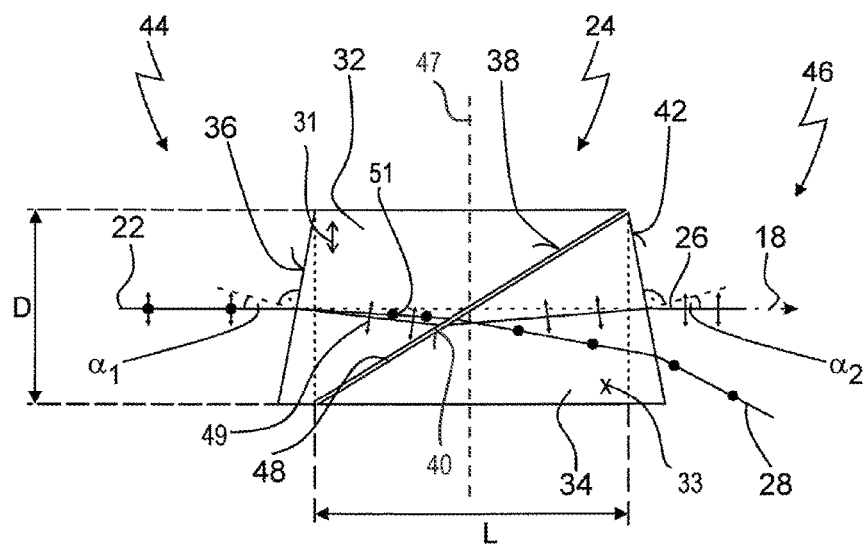
FIG. 2 shows the polarizer assembly in FIG. 1 in accordance with a first exemplary embodiment.

FIG. 2 illustrates one such polarizer assembly 24 in accordance with a first exemplary embodiment. The polarizer assembly 24 includes a first prism 32 and a further prism 34, which are arranged along the principal light incidence direction 18 (optical axis of the polarizer assembly 24). The first prism 32 has a first light entrance surface 36 and a first light exit surface 38. The further prism 34 has a further light entrance surface 40, facing the first light exit surface 38 of the first prism 32, and a further light exit surface 42.

The first prism 32 and the further prism 34 consist of a birefringent material, wherein the principal crystal axes of the birefringent material in the case of the first prism 32 and in the case of the further prism 34 are aligned perpendicularly to one another and perpendicularly to the principal light incidence direction 18. In the present case, the direction of the principal crystal axes is symbolized by an arrow 31 in the case of the first prism 32 and by a cross 33 in the case of the further prism 34, wherein in the present case the principal crystal axis of the further prism 34 points into the plane of the drawing and is aligned perpendicularly thereto. In principle, the principal crystal axis denotes the direction in an optically anisotropic uniaxial crystal along which each polarization component of a light beam experiences the same refractive index.

A first half-space 44 and a second half-space 46, which have a gas, in particular an inert gas, are situated in a manner disposed upstream of the first prism 32 and disposed downstream of the further prism 34. It goes without saying that the gas can also be ambient air.

Between the first light exit surface 38 and the further light entrance surface 40, which are parallel to one another as shown, there is situated a thin-gapped interspace 48, which is preferably filled with a UV-resistant optical cement, which is additionally matched to the refractive index of the first prism 32 and/or of the further prism 34. It goes without saying, however, that the interspace 48 can also be filled with a gas, in particular an inert gas, which has a high degeneration resistance in the UV spectral range.

In the present case, the first light entrance surface 36 and the further light exit surface 42 of the further prism 34 are oriented in a manner not perpendicular to the principal light incidence direction 18. In this case, the normal to the first light entrance surface 36 and to the further light exit surface 42 forms an angle $\alpha 1$ and respectively an angle $\alpha 2$ not equal to $0°$ with the principal light incidence direction 18. In this case, $\alpha 1$ and $\alpha 2$ are preferably equal in terms of absolute value. In this case, as is evident from FIG. 2, the light entrance surface 36 and the light exit surface 42 are inclined in opposite directions with respect to one another relative to a plane 47 perpendicular to the principal light incidence direction 18. The light entrance surface 36 and the light exit surface 42 are thus mirror-symmetrical relative to the plane 47.

As has already been described with reference to FIG. 1, the light beam 22 impinging on the polarizer assembly 24 in the principal light incidence direction 18 has no distinguished direction of the polarization, which is illustrated by means of a linear combination of the polarization in the plane of the drawing (illustrated by arrows 49) and perpendicular to the plane of the drawing (illustrated by dots 51). The different polarizations of the light beam 22 experience a retardation in the first prism 32 on account of the anisotropy of the crystal material, which leads to a temporal offset of the different polarization directions within the first prism 32. Moreover, an angular splitting of the light beam 22 into the first partial beam 26, which has the first polarization state, and the second partial beam 28, which has the second polarization state, occurs.

In the present case, the angle $\alpha 1$ and/or the angle $\alpha 2$ are/is chosen in such a way that the refraction of the first partial beam 26 at the further light exit surface 42 leads to a propagation direction of the first partial beam 26 in the second half-space 46 which substantially coincides with the principal light incidence direction 18, and thus has the smallest possible deviation in terms of location and in terms of angle relative to the principal light incidence direction 18. It goes without saying that it is possible to provide an additional geometrical adaptation of the first prism 32 and/or of the second prism 34 for optimizing the propagation direction of the first partial beam 26 in the second half-space 46, with regard to the smallest possible deviation in terms of location and in terms of angle relative to the principal light incidence direction 18.

If the first light entrance surface 36 were oriented perpendicularly to the principal light incidence direction 18 (illustrated in a dashed manner) and the further light exit surface 42 has an angle $\alpha 2 \neq 0°$, then the angle, for a partial beam 26 passing parallel to the principal light incidence direction 18, is approximately given by $\alpha 2 \approx L(ne-no)/D/(no-nl)$. In this case, L denotes the length of the polarizer assembly 24 in the direction of the principal light incidence direction 18, D denotes the height of the polarizer assembly 24 transversely with respect to the principal light incidence direction 18, no denotes the refractive index for the first partial beam 26, ne denotes the refractive index for the second partial beam 28, and nl denotes the refractive index of the medium in the second half-space 46, wherein nl for a gas assumes the value 1 to a good approximation. In the present case, ne>no. For the case where ne<no, the angle is $-\alpha 2$.

For the case where the first light entrance surface 36 has a first value $\alpha 1 \neq 0°$ and the further light exit surface 42 also has a further angle $\alpha 2 \neq 0°$, the relation between the angles approximately results from $\alpha 1 + \alpha 2 \approx L(ne-no)/D/(no-1)$ if both half-spaces 44, 46 are filled with a gas. If $\alpha 1$ is equal in magnitude to $\alpha 2$, then it can be recognized that $\alpha 1$ and $\alpha 2$ need only be of half the magnitude compared with the case where only the light exit side 42 is inclined, while the light entrance surface is oriented perpendicularly to the principal light incidence direction 18, in order to achieve the same effect. These approximations are basically also applicable to the exemplary embodiments additionally following (cf. FIG. 3 to FIG. 8).

After refraction at the further light exit surface 42, the second partial beam 28 has a propagation direction in the second half-space 46 which is usually not aligned parallel to the principal light incidence direction 18. On account of the spatial separation between the first partial beam 26 and the second partial beam 28, the second partial beam 28 can readily be separated in the present case.

It goes without saying, however, that the angles $\alpha 1$ and $\alpha 2$ can, in principle also be chosen in such a way that the second partial beam 28 is aligned parallel to the principal light incidence direction 18.

Figure 3:
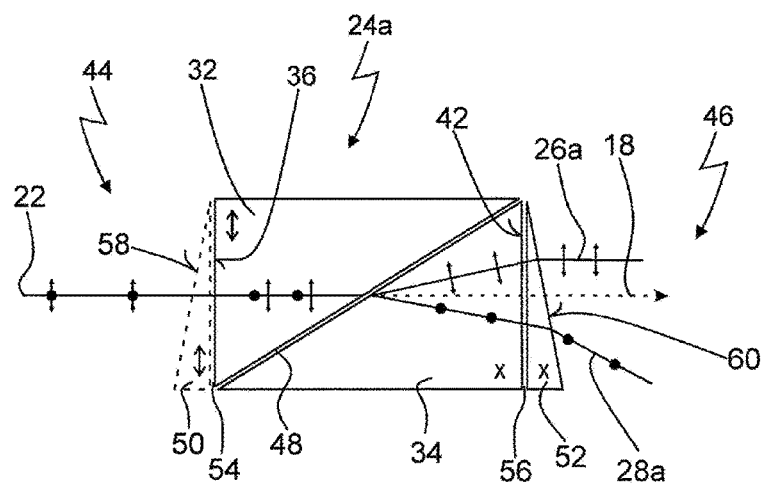
FIG. 3 shows an exemplary embodiment of a polarizer assembly that is similar to the first exemplary embodiment illustrated in FIG. 2.

FIG. 3 illustrates a modified polarizer assembly 24a with respect to the polarizer assembly 24 illustrated in FIG. 2. In this case, the first prism 32 has a first wedge 50 (illustrated in a dashed manner) or the further prism 34 has a further wedge 52. The first wedge 50 and/or the further wedge 52 enclose(s) with the first prism 32 and/or with the further prism 34 a first and/or further interspace 54, 56, which is filled with an optical cement and/or a gas, for example, analogously to the interspaces 48 between the prisms 32, 34. Furthermore, the first wedge 50 has a first interface 58 with respect to the first half-space 54, and the further wedge 52 has a further interface 60 with respect to the second half-space 46. The interface 58 of the first wedge 50 then forms the first light entrance surface of the first prism 32, and/or the interface 60 of the further wedge 52 then forms the further light exit surface 60 of the prism 34.

It goes without saying that the first wedge 52 can also be wrung onto the first prism 32, the second wedge 52 can also be wrung onto the second prism 34 and/or the first prism 32 can also be wrung onto the second prism 34, as a result of which the interspaces 48, 54, 56 substantially disappear.

The light beam 22 is split into a first partial beam 26a and a second partial beam 28a by the first prism 32 and the further prism 34. The first wedge 50 and/or the further wedge 52 deflect(s) the light beam 22 and/or the first partial beam 26 and the second partial beam 28 in the respective direction in such a way that the first partial beam 26a is aligned substantially parallel to the principal light incidence direction 18. In this case, the normal to the first light entrance surface 58 and/or the normal to the further light exit surface 60 form(s) the angle α1≠0° and α2≠0° with the principal light incidence direction 18, such that the first wedge 50 and the further wedge 52 form the first light entrance surface 36, aligned in a manner not perpendicular to the principal light incidence direction 18, and respectively the further light exit surface 42 of the exemplary embodiment described in FIG. 2. For the case where the first prism 32 has the first wedge 50 (illustrated in a dashed manner) and the further prism 34 has the further wedge 52, the first partial beam 26a is aligned substantially along the principal light incidence direction 18, and the path of the partial beams 26a, 28a is identical to the beam path of the partial beams 26, 28 in FIG. 2.

It goes without saying, however, that the first light entrance surface 58 and/or the last light exit surface 60 can also be inclined relative to the principal light incidence direction 18 in such a way that the second partial beam 28a is oriented substantially parallel to the principal light incidence direction 18 and the first partial beam 26a is oriented in a manner not parallel to the principal light incidence direction 18. Furthermore, it goes without saying that the surfaces 58, 60 can also be inclined in any suitable manner relative to the principal light incidence direction 18 in order to obtain a desired orientation of the first partial beam 26a and/or of the second partial beam 28a.

The first wedge 50 is produced from the material of the first prism 32, wherein both substantially have the same crystal orientation. The second wedge 52 is produced from the material of the further prism 34, wherein both have substantially the same crystal orientation. It goes without saying, however, that the wedges 50, 52 can also consist of other materials and/or have other crystal orientations.

Figure 4:
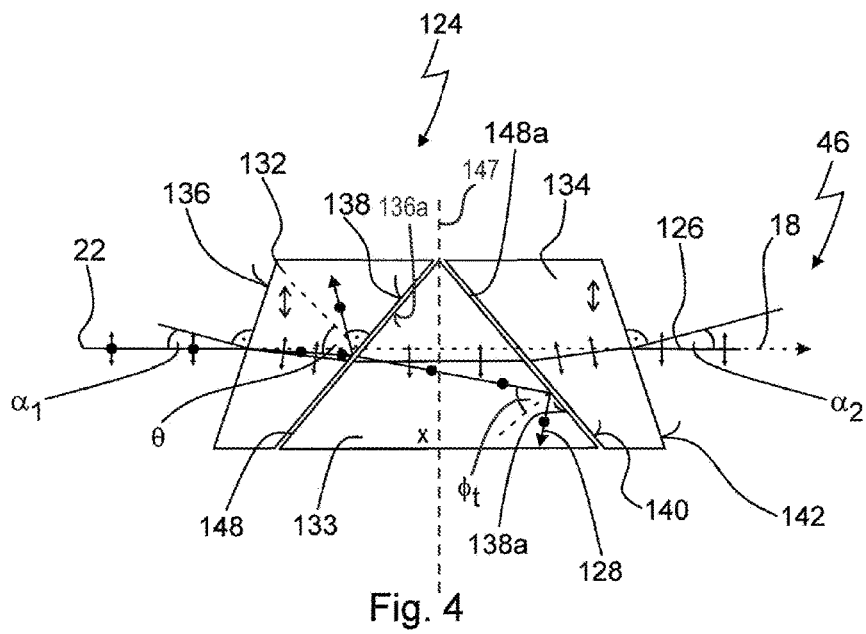
FIG. 4 shows a further exemplary embodiment of a polarizer assembly having a symmetrical arrangement of three prisms arranged one behind another.

FIG. 4 illustrates a further exemplary embodiment of a polarizer assembly 124. In the present case, the polarizer assembly 124 is likewise provided for splitting a substantially unpolarized light beam 22 into a first partial beam 126, which has a first polarization state, and a second partial beam 128, which has a second polarization state. The light beam 22 is likewise incident on the polarizer assembly 124 in the direction of the principal light incidence direction 18. The polarizer assembly 124 includes a first prism 132, a further prism 134 and a prism 133 arranged between the first prism 132 and the further prism 134.

The prisms 132, 133, 134 have mutually alternate principal crystal axes, wherein the principal crystal axes of the respective prisms 132, 133, 134, which are illustrated as arrows and crosses in the figures and denote the direction already described above, are oriented perpendicularly to the principal light incidence direction 18. The first prism 132 has a first light entrance surface 136 and a first light exit surface 138, wherein the first light exit surface 138 is arranged directly adjacent and parallel to a first light entrance surface 136a of the prism 133.

The prism 133 in turn has a light exit surface 138a, which is arranged directly adjacent and parallel to a further light entrance surface 140 of the further prism 134. The further prism 134 has a further light exit surface 142, which forms an interface of the polarizer assembly 124 with respect to the second half-space 46.

Interspaces 148, 148a are present between the light exit surfaces 138, 138a and the light entrance surfaces 136a, 140, wherein the interspace 148 is filled with an optical cement and the interspace 148a has a gas filling. The first and second partial beams 126, 128 passing in the first prism 132 impinge on the first light exit surface 138 at an angular range of the Brewster angle θ, as a result of which the first partial beam passes through the first light exit surface 138 without being reflected, whereas the second partial beam is partly reflected. The second partial beam 128 split at the first and second prisms 132, 133 thus has a reduced intensity in the second prism 133 in comparison with the first prism 132.

The second partial beam 128 additionally impinges on the second light exit surface 138a at an angle in the angular range of total internal reflection φt, as a result of which it is already separated from the first partial beam 126 at the interface between the second and further prisms 133, 134.

The normal to the light entrance surface 136 and the normal to the further light exit surface 142 form an angle α1≠0° and respectively an angle α2≠0° with the principal light incidence direction 18. In this case, the angle α1 and/or α2 are/is chosen in such a way that the propagation direction of the first partial beam 126 is oriented substantially along the principal light incidence direction 18. Preferably, once again α1=α2. Likewise, the light entrance surface 136 and the light exit surface 142 are inclined in opposite directions with respect to one another relative to a plane 147.

The polarizer assembly 124 thus has overall an odd number of prisms 132, 133, 134 and, as shown in FIG. 4, the plane 147 forms a plane of symmetry relative to which the polarizer assembly 124 is constructed mirror-symmetrically. In this case, the plane 147 of symmetry passes centrally through the central prism 133.

Figure 5:
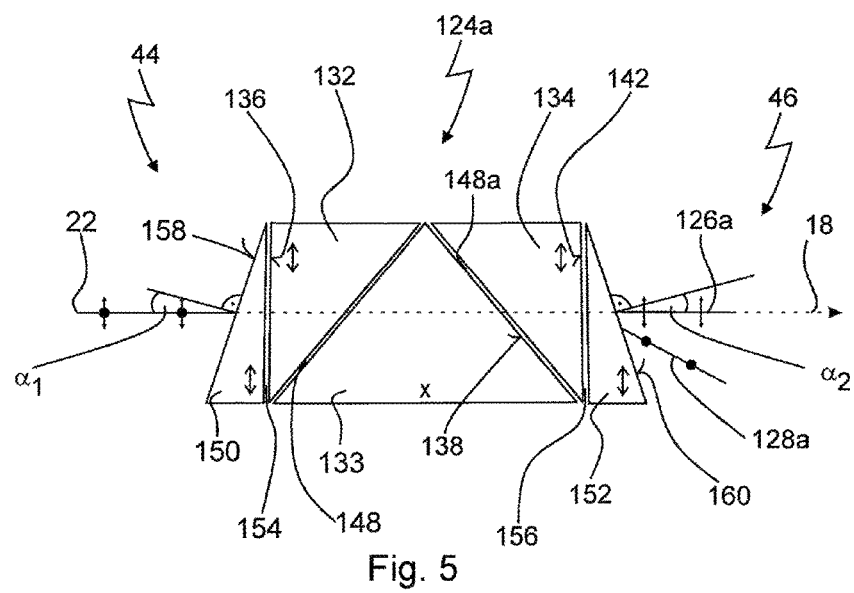
FIG. 5 shows an exemplary embodiment of a polarizer assembly that is similar to the exemplary embodiment illustrated in FIG. 4.

FIG. 5 illustrates an alternative polarizer assembly 124a with respect to the polarizer assembly 124 illustrated in FIG. 4. In this case, the first prism 132 and/or the further prism 134 have/has a first wedge 150 and/or a further wedge 152. A first and/or a further interspace 154, 156 are/is present between the first prism 132 and the first wedge 150 and/or the further prism 134 and the further wedge 152.

As in the embodiments described above, the interspaces 154, 156 are filled by a gas and/or by an optical cement. The interspaces 148 and/or 148a are likewise filled with a gas and/or with an optical cement. In the present case, no total internal reflection of the second partial beam 128a occurs at the second light exit surface 138a. It goes without saying, however, that the second light exit surface 138a can also be inclined in such a way that the second partial beam 128*a* is subjected to total internal reflection at the second light exit surface 138*a*.

The first wedge 150 has a first interface 158 with respect to the first half-space 44, which first interface then forms the first light entrance surface. The further wedge 152 has a second interface 160 with respect to the second half-space 46, which second interface then forms the further light exit surface. The normal to the first light entrance surface 158 and the normal to the last light exit surface 160 form a first angle α1 and respectively a second angle α2 not equal to 0° with the principal light incidence direction 18.

In the present case, the angles α1 and/or α2 are chosen in such a way that the light beam 22 and/or the first partial beam 126*a* and the second partial beam 128*a* are deflected in such a way that the first partial beam propagates substantially along the principal light incidence direction 18 in the second half-space 46. In the present case, the illustration of the path of the beam 22 in the polarizer assembly 124*a* was omitted for reasons of clarity.

It goes without saying that the angle α1 and/or the angle α2 can also be chosen in such a way that the first partial beam 126*a* does not propagate along the principal light incidence direction 18, and the second partial beam 128*a* propagates along the principal light incidence direction 18. Moreover, it goes without saying that the angles α1 and/or α2 can also be chosen in such a way that the partial beams 126*a*, 128*a* have an arbitrary propagation direction in the second half-space 46.

The first wedge 150 is produced from the material of the first prism 132, wherein both have substantially the same crystal orientation. The second wedge 152 is produced from the material of the further prism 134, wherein both have substantially the same crystal orientation. It goes without saying, however, that the wedges 150, 152 can also consist of other materials and/or have other crystal orientations.

Figure 6:
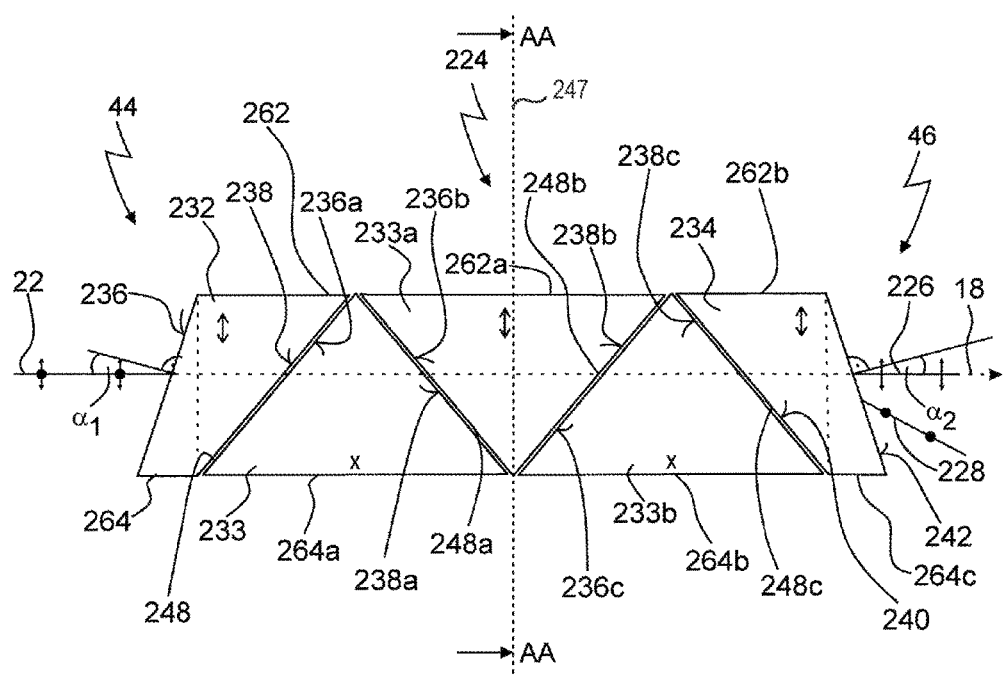
FIG. 6 shows yet another exemplary embodiment of a polarizer assembly having a symmetrical arrangement of five prisms arranged one behind another.

FIG. 6 illustrates a further polarizer assembly 224. The polarizer assembly 224 is provided for splitting a non-polarized or only partly polarized light beam 22 into a first partial beam 226 and a second partial beam 228, in order that the two partial beams 226, 228 having different polarizations are spatially separated from one another.

In the present case, the first partial beam 226 has a first polarization state and the second partial beam 228 has a second polarization state. The polarizer assembly 224 includes a first prism 232, a second prism 233, a third prism 233*a*, a fourth prism 233*b* and a further prism 234, which are arranged along the principal light incidence direction 18. The prisms 232, 233, 233*a*, 233*b*, 234 have light entrance surfaces 236, 236*a*, 236*b*, 236*c*, 240 and light exit surfaces 238, 238*a*, 238*b*, 238*c*, 242.

The alignments of the principal crystal axes of the respective prisms 232, 233, 233*a*, 233*b*, 234 are illustrated by arrows or "X", as already described above. Thin-gapped interspaces 248, 248*a*, 248*b*, 248*c* are situated between the light exit surfaces 238, 238*a*, 238*b*, 238*c* and the light entrance surfaces 236*a*, 236*b*, 236*c*, 240, which interspaces, as already described in the exemplary embodiments above, are filled either with a gas and/or with an optical cement. As shown in FIG. 6, the light exit surfaces 238, 238*a*, 238*b*, 238*c* and the light entrance surfaces 236*a*, 236*b*, 236*c*, 240 of respectively directly adjacent prisms 232, 233, 233*a*, 233*b*, 234 are parallel to one another.

The first light entrance surface 236 and the further light exit surface 242 in this case are inclined relative to the principal light incidence direction 18 in such a way that the normal to the light entrance surface 236 and the normal to the light exit surface 242 form a first angle α1 and respectively a second angle α2 not equal to 0° with the principal light incidence direction 18. The angles α1 and α2 are preferably equal in magnitude. The polarizer assembly 224, which thus has a total of five prisms 232, 233, 233*a*, 233*b*, 234, is constructed—like the polarizer assembly 124 in FIG. 4—mirror-symmetrically with respect to a plane 247 of symmetry that runs centrally through the central prism 233*a* perpendicularly to the principal light incidence direction 18.

In the present case, the first angle α1 and/or the second angle α2 are chosen in such a way that the light beam 22 impinging on the first light entrance surface 236 in the first half-space 44 is split into two partial beams 226, 228 that propagate in the second half-space 46, wherein the first partial beam 226 is oriented substantially along the principal light incidence direction 18.

It goes without saying that, as in the exemplary embodiments described above (FIGS. 2, 3 and 5), wedges can also be provided, which form the light entrance surface 236 and/or the light exit surface 242.

In this case, the light exit surfaces 238, 238*a*, 238*b*, 238*c* and/or the light entrance surfaces 236*a*, 236*b*, 236*c* directly opposite and adjacent thereto are inclined with respect to the principal light incidence direction 18 in such a way that the light beam (not illustrated) propagating in the respective prism impinges on the respective light exit surface 238, 238*a*, 238*b*, 238*c* as far as possible at the Brewster angle.

It goes without saying that the light exit surface 238*c* and the directly opposite light entrance surfaces 236*c* adjacent thereto can be inclined with respect to the principal light incidence direction 18 (not illustrated) in such a way that the partial beam 228 propagating in the fourth prism is subjected to total internal reflection at the light exit surface 238*c* (cf. FIG. 4).

The prisms 232, 233, 233*a*, 233*b*, 234 have top surfaces 262, 262*a*, 262*b* and base surfaces 264, 264*a*, 264*b*, 264*c* which have a light-absorbing layer for absorbing stray light reflected at the light exit surfaces 238, 238*a*, 238*b*, 238*c* of the respective prisms.

The light entrance surfaces 236, 236*a*, 236*b*, 236*c*, 240 and/or the light exit surfaces 238, 238*a*, 238*b*, 238*c*, 242 additionally have antireflection coatings in order to increase the transmission of the light beam propagating through the prism arrangement 224.

It goes without saying that, in principle, as many prisms as desired can be arranged between the first prism 232 and the further prism 234, preferably in an odd number, wherein the configurations described above can likewise be used alternatively or cumulatively in the case of these prisms.

The measures mentioned above can also be provided in the exemplary embodiments described above in FIGS. 1 to 5. This applies, in particular, to the alignment of the light entrance surfaces and/or light exit surfaces relative to the principal light incidence direction 18 at the Brewster angle.

In addition, it is also possible to provide, if desired, a coating of the top surfaces and/or base surfaces of the prisms shown in FIGS. 1 to 5 and a coating of the light entrance surfaces and/or light exit surfaces with an antireflection coating.

Figure 7:
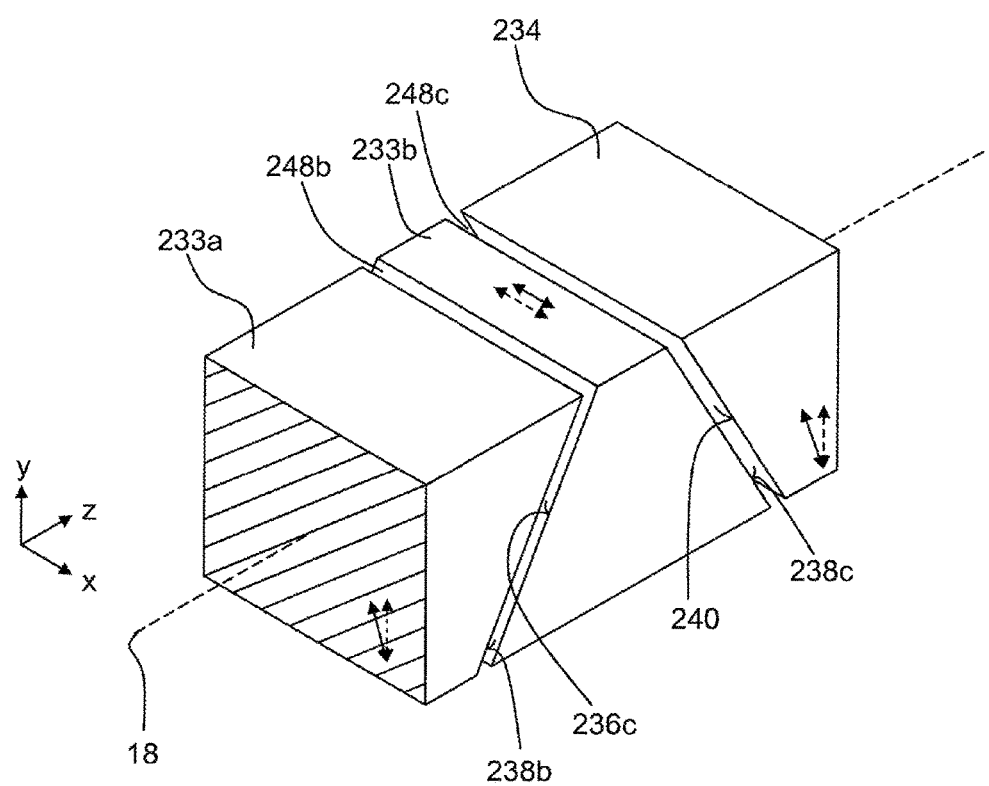
FIG. 7 shows a perspective view of an alternative exemplary embodiment of a polarizer assembly relative to the exemplary embodiments illustrated in FIG. 4 to FIG. 6.
Figure 8:
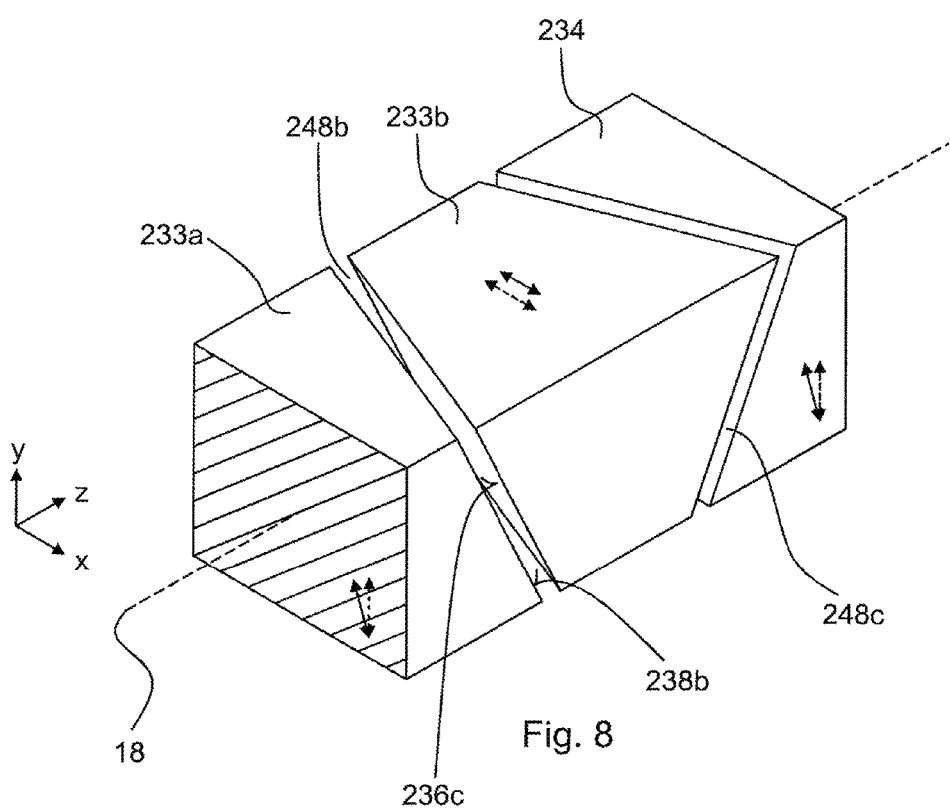
FIG. 8 shows a perspective view of a further alternative exemplary embodiment of a polarizer assembly relative to the exemplary embodiments illustrated in FIG. 4 to FIG. 6.

FIG. 7 and FIG. 8 illustrate alternative exemplary embodiments with respect to the exemplary embodiments illustrated in FIGS. 4 to 6, in a perspective partial view. These are described by way of example with reference to a section running along the sectional plane AA depicted in FIG. 6.

In the present case, the principal light incidence direction 18 is perpendicular to the sectional plane AA that divides the third prism 233a into two partial segments. In the principal light incidence direction, the third prism 233a is adjoined by the fourth prism 233b and the latter by the further prism 234 (cf. FIG. 6).

Without restricting the generality, a Euclidean coordinate system was introduced in order to clarify the illustration, wherein in the present case the z-direction is aligned along the principal light incidence direction 18 and the x- and y-directions span a plane which is parallel to the sectional plane AA and perpendicular to the principal light incidence direction 18 (cf. FIG. 6).

In the present case, the principal crystal axes of the third prism 233a, of the fourth prism 233b and of the further prism 234 are likewise arranged substantially perpendicularly to the principal light incidence direction 18 and alternately in the principal light incidence direction 18. As a result of this type of arrangement of the principal crystal axes, there arises for the latter a degree of freedom of rotation about the principal light incidence direction 18 or about the z-direction in the x, y-plane, as a result of which the principal crystal axes in principle have an orientation, which are oriented arbitrarily but fixedly in an arbitrary plane parallel to the sectional plane AA.

In the present case, two alternative arrangements—rotated in the x, y-plane—of the principal crystal axes of the respective prisms 233a, 233b, 234 are illustrated by dashed and solid arrows, respectively. The "shortening" of the first arrangement (solid arrows) relative to the further arrangement (dashed arrows) of the principal crystal axis of the fourth prism 233b results from the perspective illustration in the present case. It goes without saying here that only one of the orientations of the principal crystal axes is realized in the case of the prism arrangement 224.

FIGS. 7 and 8 additionally illustrate that the light exit surfaces 238b, 238c and the light entrance surfaces 236c, 240 of the respective prisms 233a, 233b, 234 that are directly adjacent to one another have an orientation that is tilted with respect to the sectional plane AA. The tilting is provided in the present case in FIG. 7 by a rotation of the light exit surfaces 238b, 238c and of the light entrance surfaces 236c, 240 about the x-axis.

In FIG. 8, the tilting of the light exit surfaces 238b, 238c and of the light entrance surfaces 236c, 240 constitutes a rotation about the x-direction and a rotation about the y-direction. It goes without saying that a tilting of the light exit surfaces 238b, 238c and of the light entrance surfaces 236c, 240 can also be realized as rotation about the x-direction, about the y-direction and about the z-direction (not illustrated). The light exit surfaces 238b, 238c are additionally oriented substantially parallel to the directly adjacent light entrance surfaces 236c, 240.

The interspaces 248b, 248c between the third prism 233a and the fourth prism 233b and respectively between the fourth prism 233b and the further prism 234 are likewise filled with a gas or an optical cement, as described above.

The principal crystal axes of the respective prisms 233a, 233b, 234 can also be oriented in a manner tilted with respect to a plane parallel to the sectional plane AA (not illustrated). In this case, a tilting is achieved by a rotation of the principal crystal axes about the x-direction and/or about the y-direction.

It goes without saying that the previously shown tilting of the light exit surfaces 238b, 238c and/or of the light entrance surfaces 236c, 240 is applicable in any desired manner to the light exit surfaces and light entrance surfaces shown in the exemplary embodiments described above (cf. FIGS. 1 to 5). The same applies to the orientation of the principal crystal axes of the individual prisms which are oriented substantially perpendicularly to the principal light incidence direction 18 and are oriented alternately with respect to one another in the principal light incidence direction 18, but have a degree of freedom of rotation about the principal light incidence direction 18, as a result of which they can be oriented arbitrarily, but fixedly substantially in a plane parallel to the sectional plane AA.

It additionally goes without saying that individual prisms can also be wrung onto one of the directly adjacent prisms, as a result of which the interspace usually existing between the light exit surfaces and light entrance surfaces substantially disappears. A combination of gas-filled interspaces between the individual prisms, a filling of the interspaces with an optical cement and wringing the prisms onto one another can also be realized in one and the same polarizer assembly, without departing from the scope of the disclosure.

What is claimed is:

1. An assembly, comprising:
    an odd number of at least three prisms arranged along a principal light incidence direction, wherein:
    each prism has an optical principal axis;
    for each pair of immediately adjacent prisms, the optical principal axis of one prism is perpendicular to the optical principal axis of the other prism;
    the odd number of prisms has an outermost light entrance surface and an outermost light exit surface;
    relative to a plane perpendicular to the principal light incidence direction, the outermost light entrance surface and the outermost light exit surface are inclined in opposite directions with respect to each other; and
    wherein the principal light incidence direction and a normal to the outermost light entrance surface define a first angle which is different from 0°;
    the principal light incidence direction and a normal to the outermost light exit surface define a second angle which is different from 0°; and
    an absolute value of the first angle is identical to an absolute value of the second angle.

2. The assembly of claim 1, wherein the immediately adjacent prisms comprise a first prism and a second prism, and an optical principal crystal axis of the first prism and an optical principal axis of the second prism have orientations that are fixed in a plane perpendicular to the principal light incidence direction.

3. The assembly of claim 1, further comprising a thin-gapped interspace between the the immediately adjacent prisms, wherein the thin-gapped interspace comprises a gas or a connection material.

4. The assembly of claim 1, wherein:
    the odd number of prisms comprises a first prism, a second prism and a third prism;
    the second prism is between the first and third prisms along the principal light direction;
    the first prism has a light entrance surface that is the outermost light entrance surface of the assembly;
    the third prism has a light exit surface that is the outermost light exit surface of the assembly;
    the optical principal axis of the first prism is: 1) substantially perpendicular to the principal incidence direction; and 2) perpendicular to the optical principal axis of the second prism; and
    the optical principal axis of the second prism is: 1) substantially perpendicular to the principal incidence direction; and 2) perpendicular to the optical principal axis of the third prism.

5. The assembly of claim 4, wherein:
the odd number of prisms further comprises a fourth prism and a fifth prism;
the fourth prism is between the second and third prisms along the principal light incidence direction;
the fifth prism is between the third and fourth prisms along the principal light direction;
the optical principal axis of the fourth prism is oriented:
1) substantially perpendicular to the principal incidence direction; and 2) perpendicular to the optical principal axis of the fifth prism;
the fifth prism has an optical principal crystal axis oriented substantially perpendicular to the principal incidence direction;
the optical principal axis of the fourth prism is perpendicular to the optical principal axis of the second prism; and
the optical principal axis of the fourth prism is perpendicular to the optical principal axis of the fifth prism.

6. The assembly of claim 4, wherein the assembly is configured so that, during use of the assembly, the assembly transforms an unpolarized light beam incident on the outermost light entrance surface into a first partial beam having a first polarization state and a second partial beam having a second polarization state which is different from the first polarization state; where the first partial beam and the second partial beam are spatially separated.

7. The assembly of claim 6, wherein the light beam is in a spectral range below 300 nm.

8. The assembly of claim 1, wherein the assembly is configured so that, during use of the assembly, the assembly transforms an unpolarized light beam incident on the outermost light entrance surface into a first partial beam having a first polarization state and a second partial beam having a second polarization state which is different from the first polarization state; where the first partial beam and the second partial beam are spatially separated.

9. The assembly of claim 8, wherein the light beam is in a spectral range below 300 nm.

10. An apparatus, comprising:
a light source;
an illumination optical unit; and
an imaging optical unit,
wherein:
at least one unit selected from the group consisting of the illumination optical unit and the imaging optical unit comprises an assembly according to claim 1; and
the light source, illumination optical unit and imaging optical unit are arranged successively along the principal light incidence direction.

11. The assembly of claim 10, wherein the assembly is configured so that, during use of the assembly, the assembly transforms an unpolarized light beam incident on the outermost light entrance surface into a first partial beam having a first polarization state and a second partial beam having a second polarization state which is different from the first polarization state; where the first partial beam and the second partial beam are spatially separated.

12. The apparatus of claim 11, wherein the light beam is in a spectral range below 300 nm.

13. The assembly of claim 1, wherein:
the assembly is configured so that, during use of the assembly, the assembly transforms an unpolarized light beam incident on the outermost light entrance surface into a first partial beam having a first polarization state and a second partial beam having a second polarization state which is different from the first polarization state; and
the first and second angles are configured so that the first partial beam is oriented substantially along the principal light incidence direction.

14. The assembly of claim 1, wherein:
the immediately adjacent prisms comprise a first prism and a second prism; and
at least one prism selected from the group consisting of the first prism and second prism comprises magnesium fluoride.

* * * * *

UNITED STATES PATENT AND TRADEMARK OFFICE
CERTIFICATE OF CORRECTION

| | |
|---|---|
| PATENT NO. | : 10,394,041 B2 |
| APPLICATION NO. | : 14/862292 |
| DATED | : August 27, 2019 |
| INVENTOR(S) | : Markus Bauer and Holger Muenz |

It is certified that error appears in the above-identified patent and that said Letters Patent is hereby corrected as shown below:

On the Title Page ((54) Title), and in the Specification, Column 1, Lines 1-3, delete "POLARIZER ASSEMBLY FOR SPATIALLY SEPARATION POLARIZATION STATES OF A LIGHT BEAM" and insert
-- POLARIZER ASSEMBLY FOR SPATIALLY SEPARATING POLARIZATION STATES OF A LIGHT BEAM --;

In the Claims

Column 18, Line 48, Claim 3, delete "the the" and insert -- the --;

Column 20, Line 12, Claim 11, delete "assembly" (first occurrence) and insert -- apparatus --.

Signed and Sealed this
Twenty-first Day of April, 2020

Andrei Iancu
*Director of the United States Patent and Trademark Office*